(12) United States Patent
Bloom et al.

(10) Patent No.: US 10,264,906 B2
(45) Date of Patent: Apr. 23, 2019

(54) PACKAGE DELIVERY SECUREMENT DEVICE

(71) Applicant: Spectrum Brands, Inc., Middleton, WI (US)

(72) Inventors: Mark Bloom, Ladera Ranch, CA (US); Troy Brown, Aliso Viejo, CA (US); David Downey, Mission Viejo, CA (US); Elena Gorkovenko, Mission Viejo, CA (US); Matthew Lovett, Lake Forest, CA (US)

(73) Assignee: Spectrum Brands, Inc., Middleton, WI (US)

( * ) Notice: Subject to any disclaimer, the term of this patent is extended or adjusted under 35 U.S.C. 154(b) by 0 days.

(21) Appl. No.: 15/896,828

(22) Filed: Feb. 14, 2018

(65) Prior Publication Data

US 2018/0228311 A1    Aug. 16, 2018

Related U.S. Application Data

(60) Provisional application No. 62/458,830, filed on Feb. 14, 2017.

(51) Int. Cl.
| | |
|---|---|
| *G07C 9/00* | (2006.01) |
| *H04W 4/35* | (2018.01) |
| *A47G 29/14* | (2006.01) |
| *A47G 29/20* | (2006.01) |
| *B64C 39/02* | (2006.01) |
| *G07F 17/12* | (2006.01) |

(52) U.S. Cl.
CPC ........... *A47G 29/141* (2013.01); *A47G 29/20* (2013.01); *B64C 39/024* (2013.01); *G07C 9/00912* (2013.01); *G07F 17/12* (2013.01); *H04W 4/35* (2018.02); *A47G 2029/144* (2013.01); *A47G 2029/146* (2013.01); *A47G 2029/149* (2013.01); *B64C 2201/12* (2013.01); *B64C 2201/128* (2013.01); *G07C 2009/0092* (2013.01)

(58) Field of Classification Search
CPC ............................. A47G 29/14; A47G 29/141
See application file for complete search history.

(56) References Cited

U.S. PATENT DOCUMENTS

| | | | | |
|---|---|---|---|---|
| 3,554,368 | A * | 1/1971 | Nagel ................... | B65D 29/00 156/167 |
| 6,262,664 | B1 * | 7/2001 | Maloney ................ | A45C 13/18 340/568.2 |
| 8,138,886 | B1 * | 3/2012 | Chang ................. | E05B 19/0005 340/5.22 |
| 2012/0031154 | A1 * | 2/2012 | Spiegel ................. | E05B 37/025 70/15 |

(Continued)

*Primary Examiner* — Carlos Garcia
(74) *Attorney, Agent, or Firm* — Merchant & Gould P.C.

(57) ABSTRACT

A package securement device includes a containment device in the form of either a bag or a box for receiving packages. The containment device includes an opening allowing for removal and insertion of packages. Access may be given to the interior of the containment device through an electronic device with a credential receiver configured to receive a credential input by a user. A communication module with a wireless transmitter connected to the electronic device transmits and receive a wireless communication regarding a status of the containment bag. A remote user interface may be used to monitor and control access to the containment device.

19 Claims, 4 Drawing Sheets

(56) References Cited

U.S. PATENT DOCUMENTS

| | | | |
|---|---|---|---|
| 2015/0371468 A1* | 12/2015 | MacKin | G06Q 10/0836 340/5.26 |
| 2016/0235236 A1* | 8/2016 | Byers | A47G 29/14 |
| 2017/0073085 A1* | 3/2017 | Tremblay | B64F 1/32 |
| 2017/0251856 A1* | 9/2017 | Schaible | A47G 29/20 |
| 2017/0355076 A1* | 12/2017 | Gordon-Carroll | B25J 9/0003 |

* cited by examiner

PACKAGE DELIVERY SECUREMENT DEVICE

CROSS REFERENCE TO RELATED APPLICATIONS

This application claims priority to U.S. Provisional Application Ser. No. 62/458,830 filed on Feb. 14, 2017, the entire contents of which are expressly incorporated by reference herein.

TECHNICAL FIELD

The invention is related to the field of package delivery. More specifically, the invention is related to securement of unattended, delivered packages on a doorstep or entryway.

BACKGROUND OF INVENTION

Online shoppers are increasingly becoming concerned with the safety of home-delivered goods. Shoppers with to keep deliveries from online retailers, such as Amazon, safe and even fresh in the case of perishable products. This can be partially attained by notifying shoppers of deliveries to their door.

Packages that are delivered are often left unsecured by the deliverer. There is an increase in packages being delivered and different types of delivery methods are being developed by online retailers including Amazon.

The growth of companies that deliver products direct to consumers may be slowed by the consumer's concern of the product being left unsecured at their front door. What is therefore needed is a security device that can communicate with online retailers and consumers alike to provide this level of security.

OBJECTS AND SUMMARY OF THE INVENTION

One embodiment of the invention includes a delivery box with a hook and/or metal tether to prevent unauthorized people from taking delivered boxes. Features of the delivery box may include a notification button integrated into a lock to notify the customer that a parcel has been left at the door and address verification for the courier. This can be available as an integration into the door lock as well as a standalone accessory that can be mounted on the door jamb or on the delivery box.

A package securement device may also include a containment device for receiving packages. The containment device has an access point thereby accommodating insertion and removal of the packages within the containment device. Packages may only be removed or accessed through the access point as there is no other entry. A lock on the access point is configurable to engage, thereby preventing access through the access point, and disengage thereby allowing access through the access point. A user interface on the containment device consists of a credential receiver. The credential receiver is configured to receive a credential, which is input by a user either locally through the user interface or through a mobile app. The mobile app may be installed on any portable device such as a smart phone and communicate with the credential receiver through known wireless communication protocols such as near field communications, Bluetooth, Wi-Fi, or the like.

A comparator in the containment device compares the input credential to a predetermined set of valid credentials. The lock may then be disengaged only when the input credential matches at least one valid credential from a set of predetermined valid credentials.

A communication module is integrated with the containment device. The communication module has a wireless transmitter that transmits and receives a wireless communication to a remote device regarding a status of the lock. A remote user interface may be used on the remote device, which is separate from the containment device, to wirelessly communicate with the communication module. The remote user interface may be used to automatically or manually accept the input credential and transmit the input credential to the comparator for comparison to the predetermined set of valid credentials thereby allowing remote engagement and disengagement of the lock.

The credential may also be input to the communication module by a drone either in the vicinity or remote. The lock on the access point may then disengage upon receipt of a validated credential from the drone. A user within the dwelling may also operate the remote user interface. The communication module also transmits a notice to the remote device that a valid credential, or an invalid credential, has been received.

In one embodiment the securement device may be a mesh bag. The securement device may also be a wood, metal, or alloy box with an opening lid as the access point. The remote user interface, the comparator, and the communication module may be incorporated into an electronic door lock

BRIEF DESCRIPTION OF THE DRAWINGS

The present disclosure will be described hereafter with reference to the attached drawings which are given as non-limiting examples only, in which.

Corresponding reference characters indicate corresponding parts throughout the several views. The exemplifications set out herein illustrate an embodiment of the invention, and such exemplifications are not to be construed as limiting the scope of the invention in any manner.

DETAILED DESCRIPTION

Figure 1:
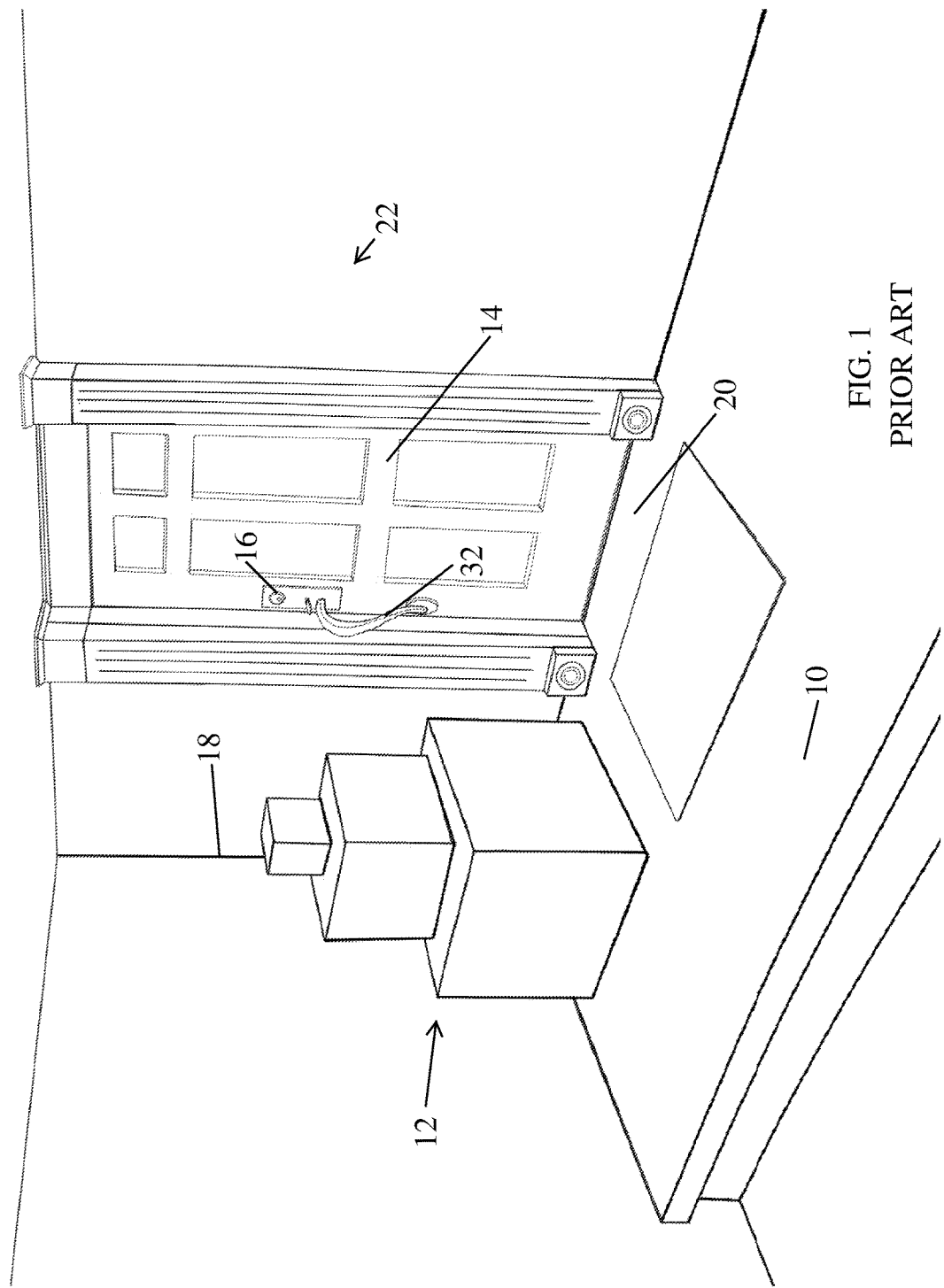
FIG. 1 is an elevated, perspective view of delivered packages according to the prior art.

FIG. 1 shows a delivered package 12 in the corner 18 of a front step 10. In a typical situation, a user orders goods which are shipped to the user's home 22. A common carrier such as the United States Post Office, UPS, FedEx, or the like delivers the packaged good to the home 22. Oftentimes the user is not available and the packages 12 are left on the front step 10 proximate the entry way 20 of the door 14. The packages 12 are typically left on the front step 10 because the door lock 16 is engaged, thereby preventing access to the interior of the home 22.

Figure 2:
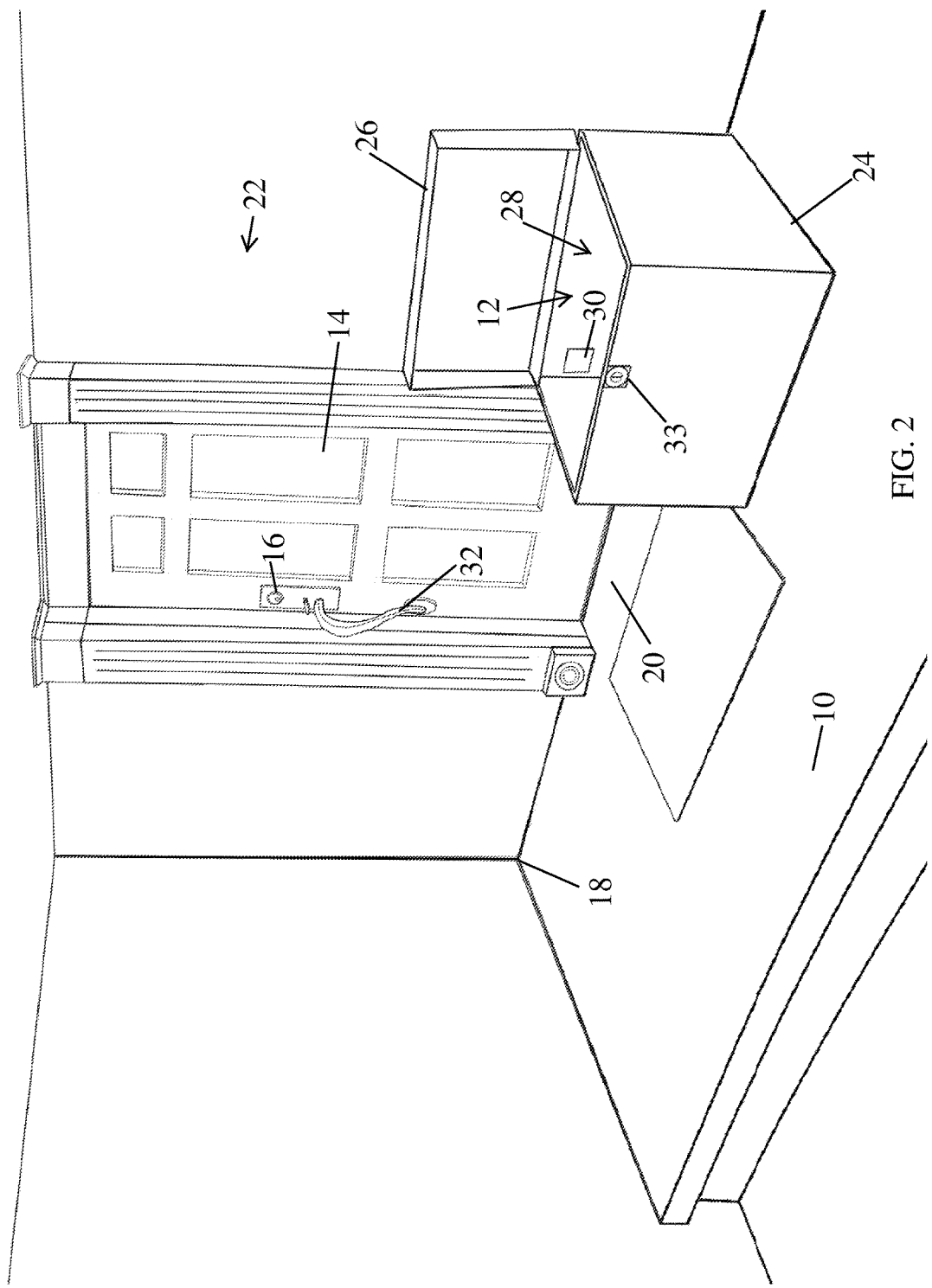
FIG. 2 is an elevated, perspective view of a package securement device according to one embodiment of the invention.

FIG. 2 presents one embodiment of the invention wherein a smart box 24 is placed on the front step 10. The smart box 24 may be secured to the home 22 or front step 10 preventing movement of the smart box 24. Alternatively, the smart box may be freely movable or placed anywhere in the vicinity of the home 22.

The smart box 24 incorporates a lid 26 which when opened, as is shown in FIG. 2, provides access to the interior of the smart box 24. The interior of the smart box 24 provides package storage 28 where delivered packages may be placed therein.

In a typical package delivery, the common carrier would arrive to the home 22 to deliver packages. Upon encountering a door 14 with an engaged door lock 16, the common carrier may open the smart box 24. To open the smart box the common carrier may provide an access code, or credential, to the electronics 30 of the smart box. The access code may be presented in any known method including near field communication, Bluetooth, WIFI, wireless communication, or the like. The electronics 30 may be equipped with a wireless communication device to receive the access code and compare the presented access code to a list of predetermined authorized codes. This comparison may be done either locally in the electronics 30 or may be done through an internet or local area network connection. Should the presented access code be matched to a code from a set of predetermined access codes, the smart lock 33 on the smart box would disengage thereby allowing the lid 26 to open. Alternatively, the user receiving the packages may validate the access code in real time through a remote device such as a smart phone. Following delivery of the packages into the package storage 28 within the smart box 24, the common carrier may close the lid 26 thereby engaging the smart lock 33 and securing the packages within the smart box. The user may then retrieve the packages from the package storage by opening the lid 26 by entering a valid access code.

Access codes may be entered through a user interface such as the door lock 16 or directly to the smart box 24. Preferably, the door lock 16 is an electronic-enabled door lock that acts as a hub to enable communications between the smart box 24 and the internet or local area network. The user interface may also consist of a touch panel on the smart box or on the door lock 16. The user interface may also be an app on any portable device such as a tablet or mobile phone. Alternatively, the user interface may use a camera and a microphone to enable audio and video communication between the common carrier and the package receiver. The camera and microphone may be equipped as part of the door lock 16 or part of the smart box 24. The audio and video communication may also be used as the input credential for the package receiver to authenticate. In other words, the package receiver may visually confirm that the common carrier, or other person, is authorized and grant them access to the smart box 24 by disengaging the smart lock 33 remotely. In this situation, the package receiver may allow for anyone to deliver, or take, packages to and from the smart box 24.

Figure 3:
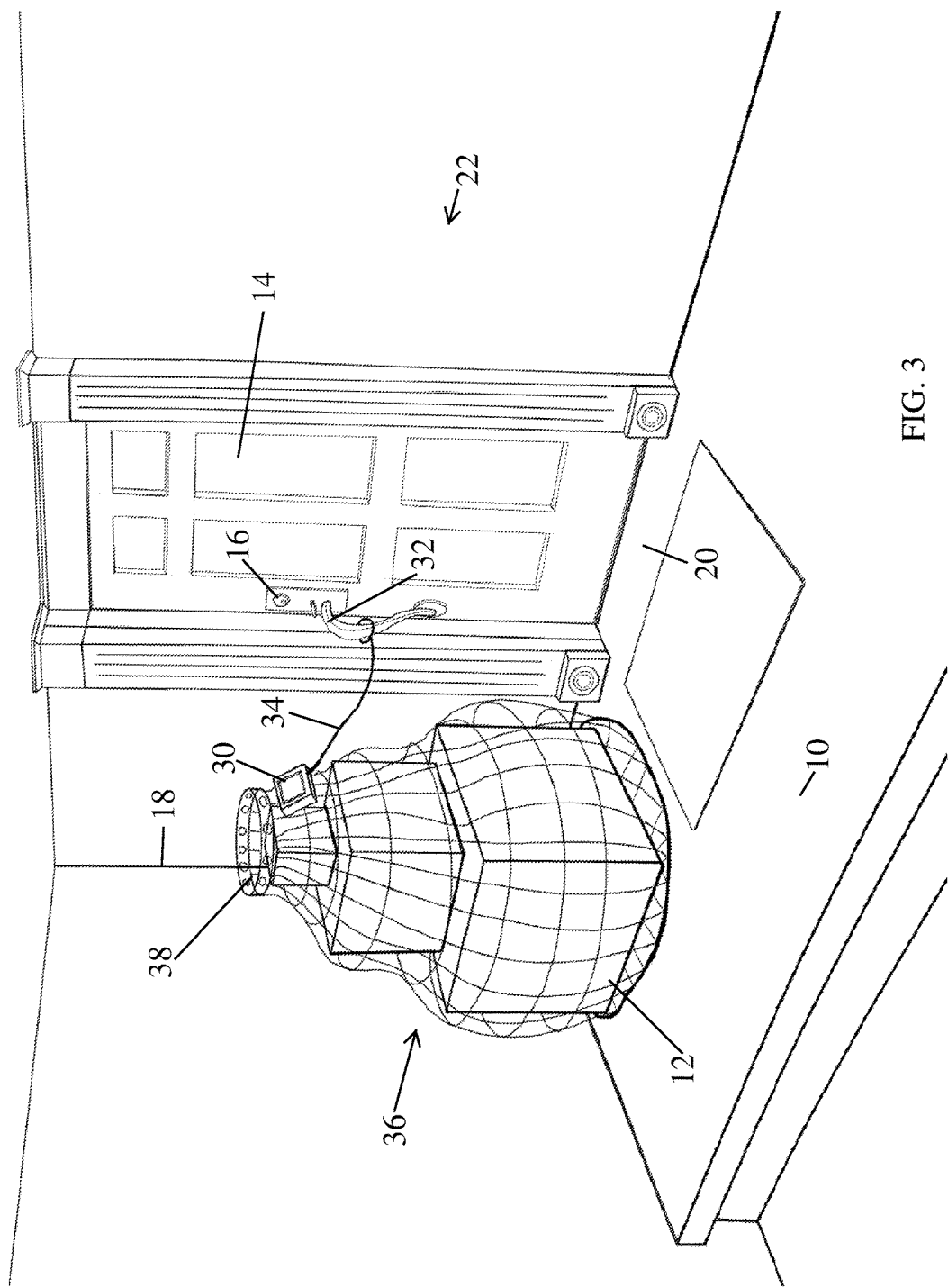
FIG. 3 is an elevated, perspective view of a package securement device according to another embodiment of the invention.

Transitioning now to FIG. 3, an alternative embodiment of the invention is shown. A smart bag 36 may be located on the front step 10 of the home 22. The smart bag 36 may also be placed anywhere in proximity to the home 22 that is accessible by the common carrier or package delivery service. The smart bag 36 is preferably constructed out of a mesh material that is see-through. The smart bag 36 may also be constructed out of a water-resistant material that is opaque. Regardless of the smart bag 36 construction, the smart bag 36 includes an opening 38 that allow packages to be inserted into and removed from. The opening 38 forms an access point into the smart bag 36. As depicted in FIG. 3, the delivered packages 12 within the smart bag 36 may be removed from the smart bag 36 by entering a credential into a user interface. The user interface may be incorporated into the electronics 30 of the smart bag 36 or the user interface may be a remote user interface such as a mobile phone, tablet, or similar device. In practice, the smart bag 36 operates virtually the same as the previously discussed embodiment of FIG. 2. The smart bag 36, however, does not include a lid. The opening 38 of the smart bag 36 may be closed automatically following a prompt by a user through the user interface. Just as a user may close the lid 26 of the smart box 24 disclosed in FIG. 2, the opening 38 may be closed in similar fashion.

The opening 38 may also be secured closed manually with a padlock. The electronics 30 would just be used to provide notification to a remote user that packages are being delivered. Proper authentication of the credentials would then be used to avoid triggering an alarm. The alarm may be a local audible alarm or a remote notification to a user, or a combination of both.

The smart bag 36 may also be tethered to the door 14 via a tether 34 attached to a handle 32. The tether 34 may also be secured to any other immovable object attached to the home 22 or surroundings. The tether 34 may secure directly to the smart bag 36 or be attached to the electronics 30. If attached to the electronics 30, the tether could be disengaged from the smart bag 36 by a successful authentication of a credential input by a user or common carrier. On the handle 32 side, the tether 34 may be attached with a padlock or by weaving the tether 34 through a looped end, around the handle 32 prior to securing the end to the smart bag 36.

Figure 4:
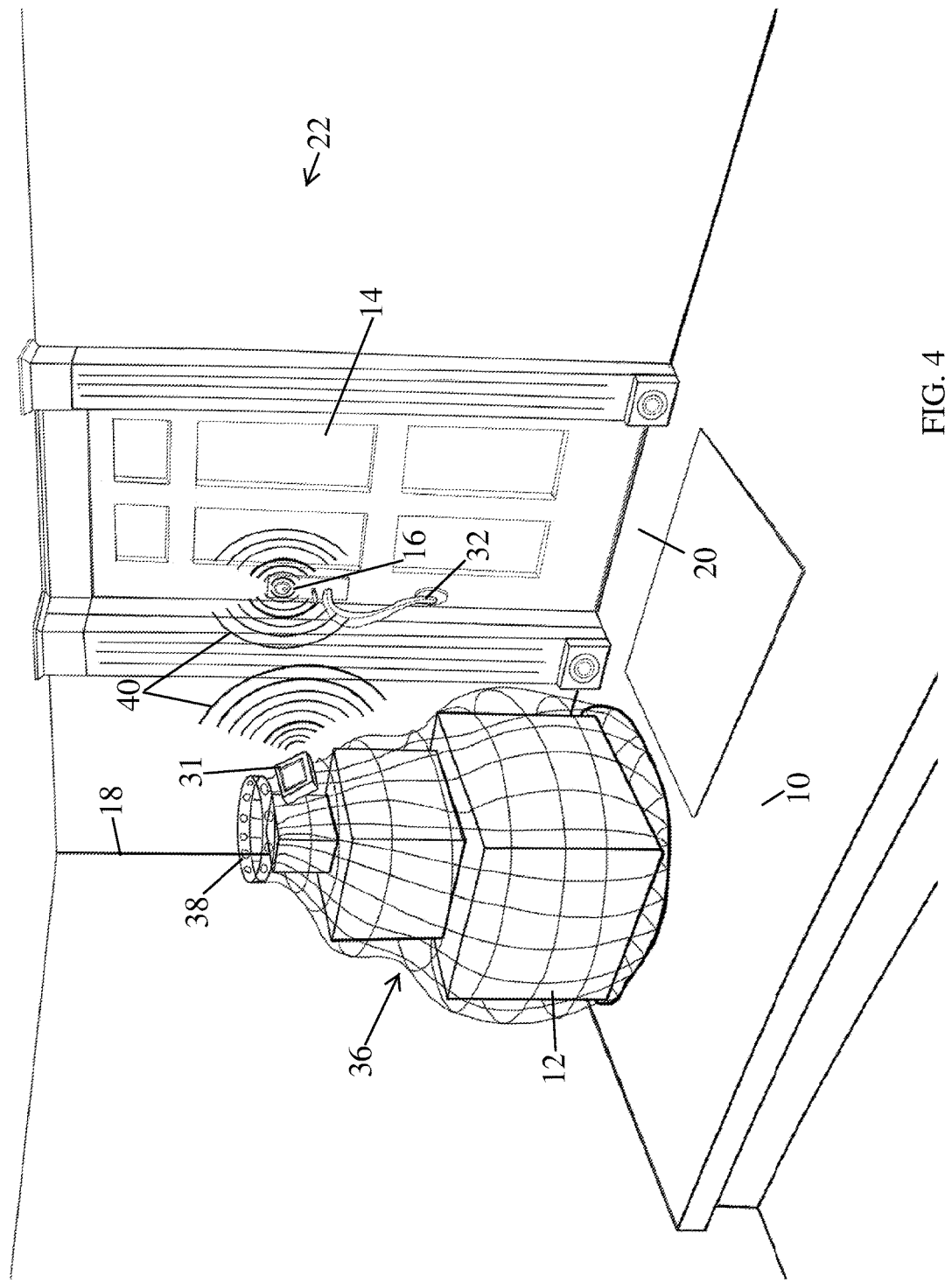
FIG. 4 is an elevated, perspective view of a package securement device according to yet another embodiment of the invention.

FIG. 4 depicts how the smart bag 36 could interact with a door lock 16. The door lock 16 is equipped with wireless communication electronics that act as a hub to facilitate communications with a remote user interface such as a mobile phone, tablet, computer or the like. The door lock 16 may also incorporate a user interface either on the outside of the door 14, inside of the door 14, or on both sides of the door 14. Preferably, the door lock 16 relays communication signals 40 that it receives from the electronic lock 31 on the smart bag 36. A tether may also be used as depicted in FIG. 3, or the electronic lock 31 may include an audible alarm that also sends notifications of tampering or unauthorized access via communication signals 40 that are received by the door lock 16 and relayed to the remote user interface.

If the smart bag 36 is moved beyond a programmable threshold, the electronic lock can activate the alarm. Also, the smart bag 36 may include a sensor that senses objects passing through the opening. As objects, such as delivered packages 12 are inserted into the smart bag 36, a notification may be sent to the remote user interface. Any removal of packages may also be sensed and transmitted. The sensor may be included anywhere in the smart bag 36 but preferably are in an eyelet at the opening 38 of the smart bag 36.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

We claim:

1. A package securement device comprising:
   a containment device for receiving packages;
   an access point in the containment device, wherein removal of the packages within the containment device is only available through the access point;

a lock on the access point configurable to engage thereby preventing access through the access point and disengage thereby allowing access through the access point;

a user interface integrated into a door lock on an exterior door of a dwelling including a credential receiver configured to receive an input credential by a user, wherein the door lock is configured to wirelessly communicate with the containment device;

a comparator in the containment device configured to compare the input credential to a predetermined set of valid credentials thereby disengaging the lock only when the input credential matches at least one valid credential from a set of predetermined valid credentials;

a communication module with a wireless transmitter configured to transmit and receive a wireless communication to a remote device regarding a status of the lock; and a remote user interface on the remote device separate from the containment device and the door lock in wireless communication with the communication module configured to accept an input credential and transmit the input credential to the comparator for comparison to the predetermined set of valid credentials thereby allowing remote engagement and disengagement of the lock.

2. The package securement device according to claim 1 wherein the communication module is configured to wirelessly accept a credential from a drone and the lock on the access point disengages upon receipt of a validated credential.

3. The package securement device according to claim 1 wherein the remote user interface is operable from within a dwelling.

4. The package securement device according to claim 1 wherein the communication module is configured to transmit to the remote device a notice that a valid credential has been received.

5. The package securement device according to claim 1 wherein the securement device is a mesh bag.

6. The package securement device according to claim 5 further comprising a tether securing the mesh bag to a structure.

7. The package securement device according to claim 1 wherein the securement device is a lock box.

8. A package securement device comprising:
a containment device for receiving packages;
a lid on the containment device configured to articulate between an open and a closed position;
an access point formed on the containment device only when the lid is in an open position, wherein removal of packages within the containment device is only available through the access point;
a lock on the access point configurable to engage and secure the lid in the closed position and disengage thereby allowing the lid to be moved to the open position;
an electronic device in the containment device with a communication module including a wireless transmitter configured to transmit and receive a wireless communication with a door lock mounted to an exterior door of a dwelling; and
a remote user interface on the door lock separate from the containment device in wireless communication with the communication module configured to accept an input credential and transmit an unlock command to the lock on the access point thereby allowing remote engagement and disengagement of the lock on the access point from the door lock.

9. The package securement device according to claim 8 wherein the communication module is configured to wirelessly accept a credential from a drone and the lock on the access point disengage upon receipt of a validated credential.

10. The package securement device according to claim 9 wherein the lid automatically articulates to the closed position and the lock on the access point engages following reception of the delivered package from the drone.

11. The package securement device according to claim 8 wherein the remote user interface is operable from within a dwelling.

12. The package securement device according to claim 8 wherein the communication module is configured to transmit to the remote device a status of the lock on the access point of the containment device.

13. A package securement device comprising:
a containment bag tethered to a home with a tether for receiving packages;
an opening in the containment bag forming an access point, wherein removal and insertion of packages within the containment bag is only available through the access point;
an electronic lock on the access point configured to engage to close the opening and disengage to open the opening;
an electronic device attached to the containment device including a communication module with a wireless transmitter connected to the electronic device configured to transmit and receive a wireless communication to a door lock regarding a status of the containment bag;
a remote user interface integrated into an electronic door lock on an entry door of a dwelling that is separate from the containment bag and in wireless communication with the communication module; and
a comparator in the door lock configured to compare an input credential to a predetermined set of valid credentials thereby transmitting an unlock signal to the electronic lock on the containment device only when the input credential matches at least one predetermined valid credential.

14. The package securement device according to claim 13 wherein the containment bag is a mesh bag with openings between the mesh of at least 0.5 inches.

15. The package securement device according to claim 13 wherein the remote user interface on the electronic door lock is configured to also communicate wirelessly with an app on one of a cell phone, tablet, or computer.

16. The package securement device according to claim 13 wherein at least one of the communication module and the door lock is in communication with a remote, cloud-based server.

17. The package securement device according to claim 13 wherein the predetermined set of valid credentials is defined and editable by a user through the remote user interface.

18. The package securement device according to claim 13 wherein the communication module includes an alarm configured to activate when the containment bag is cut.

19. The package securement device according to claim 13 wherein the communication module includes an alarm configured to activate when the tether is cut.

* * * * *

UNITED STATES PATENT AND TRADEMARK OFFICE
CERTIFICATE OF CORRECTION

PATENT NO. : 10,264,906 B2
APPLICATION NO. : 15/896828
DATED : April 23, 2019
INVENTOR(S) : Bloom et al.

Page 1 of 1

It is certified that error appears in the above-identified patent and that said Letters Patent is hereby corrected as shown below:

In the Claims

Column 6, Line 7, Claim 9: "access point disengage upon" should read --access point disengages upon--

Signed and Sealed this
Tenth Day of September, 2019

Andrei Iancu
*Director of the United States Patent and Trademark Office*